No. 809,421. PATENTED JAN. 9, 1906.
A. W. BOON.
EXPANSIBLE SPROCKET.
APPLICATION FILED JAN. 27, 1904.
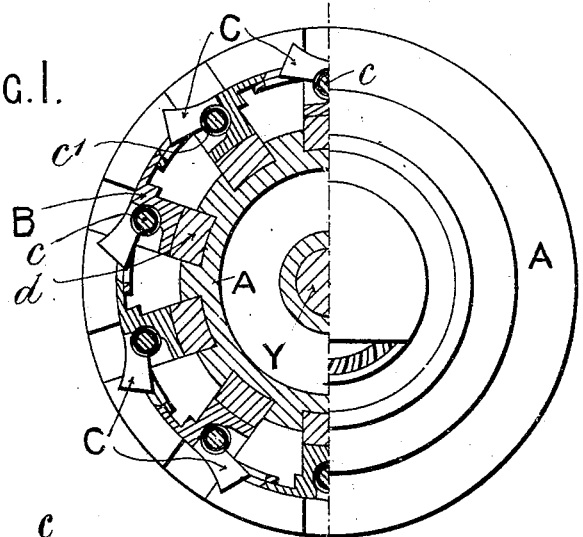
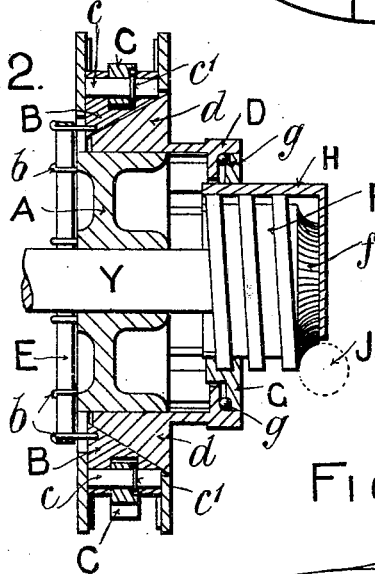
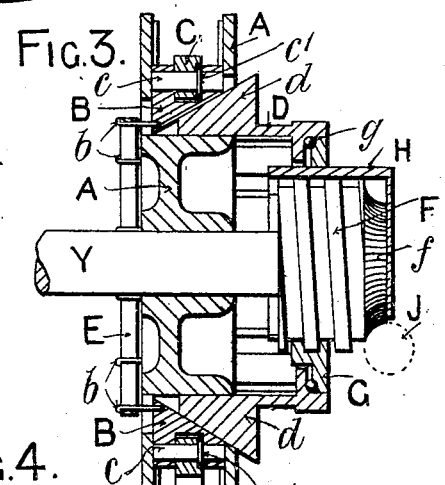
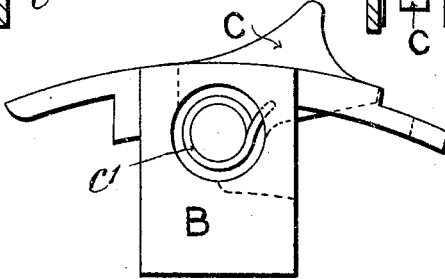
WITNESSES:
G. V. Symes.
E. L. George.
INVENTOR.
A. W. Boon.
Per Robert C. Phillips
Attorney.

UNITED STATES PATENT OFFICE.

ARTHUR WILLIAM BOON, OF BRIXTON, ENGLAND.

EXPANSIBLE SPROCKET.

No. 809,421.    Specification of Letters Patent.    Patented Jan. 9, 1906.

Application filed January 27, 1904. Serial No. 190,842.

*To all whom it may concern:*

Be it known that I, ARTHUR WILLIAM BOON, a subject of the King of Great Britain, residing at 50 Coldharbour Lane, Brixton, in the county of Surrey, England, have invented a certain new and useful Improvement in Expansible Sprockets, (for which I have applied for Letters Patent in Great Britain, No. 1,939, bearing date January 27, 1903, and in Germany, No. 35,638, IX/47, bearing date November 7, 1903,) of which the following is a full, clear, and complete specification.

This invention relates to a driving-gear for cycles, motor-cars, and other machinery; and it consists, essentially, of a sprocket-wheel having a variable circumference made up of a series of segmental blocks which carry teeth so constructed and arranged that those which are at any time out of pitch with the driving-chain are inoperative. Either one or two of these wheels may be employed. If one only is used, a jockey-pulley must be employed to take up the slack of the driving-chain when the variable wheel is reduced in circumference. If two such wheels are employed, they are so arranged that as the circumference of one is enlarged that of the other is reduced, and vice versa. Two or more groups of such wheels may be employed.

In the accompanying drawings, which illustrate this invention, Figure 1 is a view in side elevation of the wheel, partly in section. Figs. 2 and 3 are views in cross-section, showing the wheel in its extreme positions; and Fig. 4 is a view, on an enlarged scale, showing construction and arrangement of one of the teeth.

Throughout the views similar parts are marked with like letters of reference.

The improved wheel consists of a drum or disk A, in which are a series of radial slots, in which are mounted a series of sliding blocks B, which are so shaped and arranged that they form the periphery of the wheel, the circumference of which can be varied by varying the position of said blocks in said slots. Each of these blocks carries a tooth C, which is pivoted to the blocks or segments B by a transverse pin $c$, so that it can rise and fall with respect to said block. The teeth are kept in their operative positions by springs of a suitable construction, such as shown in Figs. 1 and 4, operating between the teeth and the blocks in which said teeth are pivoted. Instead of mounting the teeth C direct onto the blocks B they may each be pivoted to a pair of links, one of which is pivoted to the sliding block and the other to the drum with the object of relieving the sliding blocks of some of the driving strain.

I do not limit myself to the use of teeth of any particular shape. That shown in Fig. 1 I have found satisfactory; but the tooth may be made of any other shape on its working face—for instance, concave, as shown in Fig. 4.

The blocks B are caused to move radially to increase or decrease the circumference of the wheel by any suitable mechanism—such, for instance, as that illustrated, in which a collar D, carrying laterally-projecting pins $d$, shaped to form inclined planes or wedges, is moved laterally, so that the pins carried by it engage the inner sides of the blocks or segments B, which are inclined or otherwise suitably shaped to contact with said pins, the blocks being kept in contact with said pins by one or more suitably-arranged springs—such, for instance, as the circular spring E, acting on the blocks B through the pins $b$. Lateral movement may be imparted to the collar D by any suitable mechanism—such, for instance, as that illustrated, in which a screw F, formed on or fixed to the axle Y, engages nut G, which is prevented from rotating by engaging a fixed guide H and is coupled to the collar D by a ball-bearing connection $g$. The screw F is rotated by means of a worm J engaging a circular rack $f$ or its equivalent on the screw F.

The drum or disk A may be either fixed to the hub or axle to which motion is to be imparted or from which motion is derived or coupled thereto by any suitable form of clutch which will allow it to overrun the said hub or axle.

What I claim, and desire to secure by Letters Patent, is—

1. In a variable sprocket-wheel the combination with a drum having a series of radially-arranged slots, of a series of adjustable blocks forming a variable circumference to said drum, of teeth pivoted in recesses in said blocks, and of springs operating to retain said teeth in their operative positions but allowing them to give way when they are inoperative, as set forth.

2. A variable sprocket-wheel comprising a drum A, a series of blocks B adjustably mounted in radial slots in said drum, teeth C pivoted transversely in recesses in said blocks, springs C' operating to retain said teeth in their active positions, and means for varying the positions of the blocks in the radial slots in the drum, as set forth.

3. In a variable sprocket-wheel comprising a drum A, a series of blocks B arranged to slide in radial slots in said drum and means for varying the positions of said blocks in said drum, sprocket-teeth C pivoted to said blocks having one face shaped to engage the links of the sprocket-chain so as to receive from it or impart to it motion in one direction, the other face of the teeth being so shaped that it will not engage with the sprocket-chain but turn on its pivot and so become inoperative, as set forth.

4. The combination in a variable sprocket-wheel of a drum A having a series of radial slots, a series of blocks B mounted to slide in the slots in said drum, teeth C pivoted transversely to the blocks B, springs $c'$ operating to keep the teeth C in their operative positions with reference to the circumference of the wheel, and means for varying the positions of the blocks in the radial slots in the drum, as set forth.

ARTHUR WILLIAM BOON.

Witnesses:
ROBERT E. PHILLIPS,
G. V. SYMES.